US009335942B2

(12) United States Patent  
Kumar et al.

(10) Patent No.: US 9,335,942 B2  
(45) Date of Patent: May 10, 2016

(54) METHODS AND STRUCTURE FOR LUN MASKING IN A SWITCHING DEVICE

(75) Inventors: Umang Kumar, Bangalore (IN); Nishant Kumar Yadav, Bangalore (IN); Abhijit Suhas Aphale, Rahul Park (IN)

(73) Assignee: Avago Technologies General IP (Technologies) Pte. Ltd., Singapore (SG)

( * ) Notice: Subject to any disclaimer, the term of this patent is extended or adjusted under 35 U.S.C. 154(b) by 521 days.

(21) Appl. No.: 13/450,118

(22) Filed: Apr. 18, 2012

(65) Prior Publication Data

US 2013/0282978 A1    Oct. 24, 2013

(51) Int. Cl.  
G06F 12/00    (2006.01)  
G06F 3/06    (2006.01)

(52) U.S. Cl.  
CPC .............. G06F 3/0622 (2013.01); G06F 3/067 (2013.01); G06F 3/0659 (2013.01)

(58) Field of Classification Search  
CPC ........................................................ G06F 3/067  
USPC ........................................................ 711/114  
See application file for complete search history.

(56) References Cited

U.S. PATENT DOCUMENTS

| | | | |
|---|---|---|---|
| 7,165,152 B2* | 1/2007 | Blumenau et al. | 711/152 |
| 2002/0176434 A1* | 11/2002 | Yu | H04L 49/103 370/422 |
| 2005/0018672 A1* | 1/2005 | Dropps | G06F 21/85 370/389 |
| 2005/0228924 A1* | 10/2005 | Marushak et al. | 710/300 |
| 2006/0101171 A1* | 5/2006 | Grieff | G06F 13/387 710/36 |
| 2007/0162592 A1* | 7/2007 | Marks et al. | 709/224 |
| 2007/0168470 A1* | 7/2007 | Nonaka et al. | 709/219 |
| 2009/0172706 A1* | 7/2009 | Jones | H04L 29/08846 719/326 |
| 2009/0222733 A1* | 9/2009 | Basham et al. | 715/736 |
| 2010/0042805 A1 | 2/2010 | Recio et al. | |
| 2010/0215041 A1* | 8/2010 | Petty | 370/392 |
| 2011/0145452 A1* | 6/2011 | Schilling et al. | 710/74 |
| 2012/0089567 A1* | 4/2012 | Takahashi et al. | 707/634 |
| 2012/0271925 A1* | 10/2012 | Miller et al. | 709/220 |
| 2013/0117767 A1* | 5/2013 | Myrah et al. | 719/326 |
| 2013/0191573 A1* | 7/2013 | Raghavan et al. | 710/300 |

OTHER PUBLICATIONS

Release Notes for Firmware Upgrade V100B07, published on Jan. 23, 2009, ask.adaptec.com, pp. 1-2.*  
Wong, Linus, Using SAS as a Networked Storage Fabric, Jul. 2005, Serial Storage Wire Archive, pp. 1-3.*  
Bill King, "LUN Masking in a SAN," Copyright 2001—QLogic Communications, Inc. 12 pages.

* cited by examiner

*Primary Examiner* — Adam M Queler  
*Assistant Examiner* — Kenneth Tsang

(57) ABSTRACT

Methods and structure for masking of logical unit numbers (LUNs) within a switching device coupled with one or more storage enclosures. Each storage enclosure defines one or more logical volumes each identified by a LUN within the storage enclosures. The switching device gathers LUN definition information regarding each LUN defined by each storage enclosure coupled with the switching device. LUN access permission information may be provided by an administrative node/user defining a level of access permitted or denied for each host system for each LUN for each storage enclosure. The switching device then intercepts a REPORT LUNS command from any host directed to a storage enclosure and responds with only those LUNs to which the requesting host system has permitted access. Further, any other SCSI command intercepted at the switching device directed to a LUN to which the host system does not have access is modified to identify an invalid LUN.

20 Claims, 6 Drawing Sheets

METHODS AND STRUCTURE FOR LUN MASKING IN A SWITCHING DEVICE

BACKGROUND

1. Field of the Invention

The invention relates generally to storage systems and more specifically relates to methods and structure for masking access to logical volumes. The logical volumes are provisioned within storage enclosures configured to define logical unit numbers (LUNs) for the logical volumes within the enclosure.

2. Discussion of Related Art

High capacity storage systems may include hundreds or thousands of storage devices (e.g., magnetic/optical disk drives and/or solid-state drives). Often, groups of the storage devices are physically configured within a storage enclosure. The enclosure provides common power and cooling for the storage devices within the enclosure. Enclosures that provide limited control logic within the enclosure are often referred to as Just a Box of Disks ("JBOD"). Some enclosures provide substantial control logic including, for example, Redundant Array of Independent Disks (RAID) storage management to provide enhanced reliability and performance. Such enclosures may incorporate one or more RAID storage controllers and are often referred to as a RAID Box of Disks (RBOD). Each enclosure (JBOD or RBOD) may have one or more logical devices (i.e., sometimes referred to as "logical drives" or "logical volumes") configured—each provisioned by portions of one or more of the storage devices within the enclosure. Each such logical device is typically identified by a corresponding logical unit number ("LUN"). LUNs are simply numbers used to identify the corresponding logical device to external host systems. Control logic of the enclosure may include mapping information to map a LUN and a logical address received in an I/O request into corresponding physical locations of one or more affected physical storage devices.

It is generally desirable to provide some level of masking or permissions associated with LUNs within a storage enclosure so that particular LUNs may be exposed to certain host system while other LUNs may be hidden from particular host systems. Such permission masking enables security in the configuration of a storage system comprising multiple enclosures. Some storage enclosure vendors provide some form of permission masking or access control while other vendors may provide none. Where a storage system comprises a homogenous collection of enclosures all from the same vendor, the permission masking or access control will be managed in a uniform manner among all the enclosures.

However, it is a problem to provide uniform management of permission masking or access control for logical volumes (i.e., for LUNs identifying each of multiple logical devices) where the system comprises a heterogeneous collection of enclosures from multiple vendors. Each vendor may provide a different management interface for managing permissions and access control. Further, some vendors may offer no such permission or access control.

Thus it is an ongoing challenge to simplify management of permissions or access control associated with logical devices identified by LUNs within one or more storage enclosures of the storage system.

SUMMARY

The present invention solves the above and other problems, thereby advancing the state of the useful arts, by providing methods and structure for defining and enforcing access permission controls for all logical devices of a storage system from within a switch of a switched fabric that couples host systems to the logical devices. A switching device in accordance with features and aspects hereof comprises control logic to define access permission information (e.g., access control information) associated with each LUN defined by an attached storage enclosure (i.e., an attached RBOD/JBOD). By defining the permission information in a switching device of the system, uniform management and utilization of such LUN permissions is achieved even in a heterogeneous mix of storage enclosures from varying vendors—each providing different permission management or no permission management features.

In one aspect hereof, a switching device is provided. The switching device is operable to selectively couple one or more host systems with one or more storage enclosures. Each storage enclosure defines one or more logical devices, each logical device associated with a corresponding LUN. The switching device comprises a back end interface adapted to communicatively couple the switching device with the one or more storage enclosures and a front end interface adapted to communicatively couple the switching device with the one or more host systems. The switching device further comprises switching logic coupled with the front end interface and coupled with the back end interface. The switching logic is adapted to controllably establish a logical connection between a host system through the front end interface and a logical volume of the storage enclosure through the back end interface, wherein the logical volume is identified by a corresponding LUN. The switching device further comprises control logic coupled with the switching logic and coupled with the front end interface. The control logic is adapted to determine whether the host system is permitted to access a LUN identified in a request received from the host system through the front end interface. The control logic is further adapted to control the switching logic to forward the request for processing to the identified LUN only in response to determining that the requesting host system is permitted to access the identified LUN.

Another aspect hereof provides a method operable in a switching device. The switching device is adapted to couple with one or more host systems and adapted to couple with one or more storage enclosures. Each storage enclosure defines one or more logical volumes each volume identified by a corresponding LUN. The method comprises providing a LUN access permission structure in a memory of the switching device wherein the LUN access permission structure identifies a level of access permission for each host system to access each LUN of each storage enclosure. The method further comprises receiving a request from an attached host system directed to an identified LUN of an identified storage enclosure wherein the request comprises a SCSI command and querying the LUN access permission structure to determine whether the attached host system has sufficient access permission to the LUN identified in the received I/O request. The method then forwards the I/O request for processing at the identified storage enclosure only in response to determining that the attached host system has sufficient access permission to the identified LUN.

Yet another aspect hereof provides a method operable in a Serial Attached SCSI (SAS) expander to implement LUN masking. The expander is adapted to couple with one or more host systems and adapted to couple with one or more storage enclosures. Each storage enclosure defines one or more logical volumes each associated with a corresponding LUN. The method comprises providing a LUN access permission structure in a memory of the expander wherein the LUN access permission structure identifies a level of access permission for each host system to access each LUN of each storage enclosure. The method further comprises receiving a "REPORT LUNS" SCSI command in the expander from an attached host system directed to an identified storage enclosure. The method then determines, responsive to receipt of the "REPORT LUNS" command and based on information in the LUN access permission structure, which LUNS of the identified storage enclosure the attached host system has permission to access. The method then responds to the "REPORT LUNS" command by reporting from the expander to the attached host system only LUNS to which the attached host system has access as determined based on information in the LUN access permission structure.

DETAILED DESCRIPTION OF THE DRAWINGS

Figure 1:
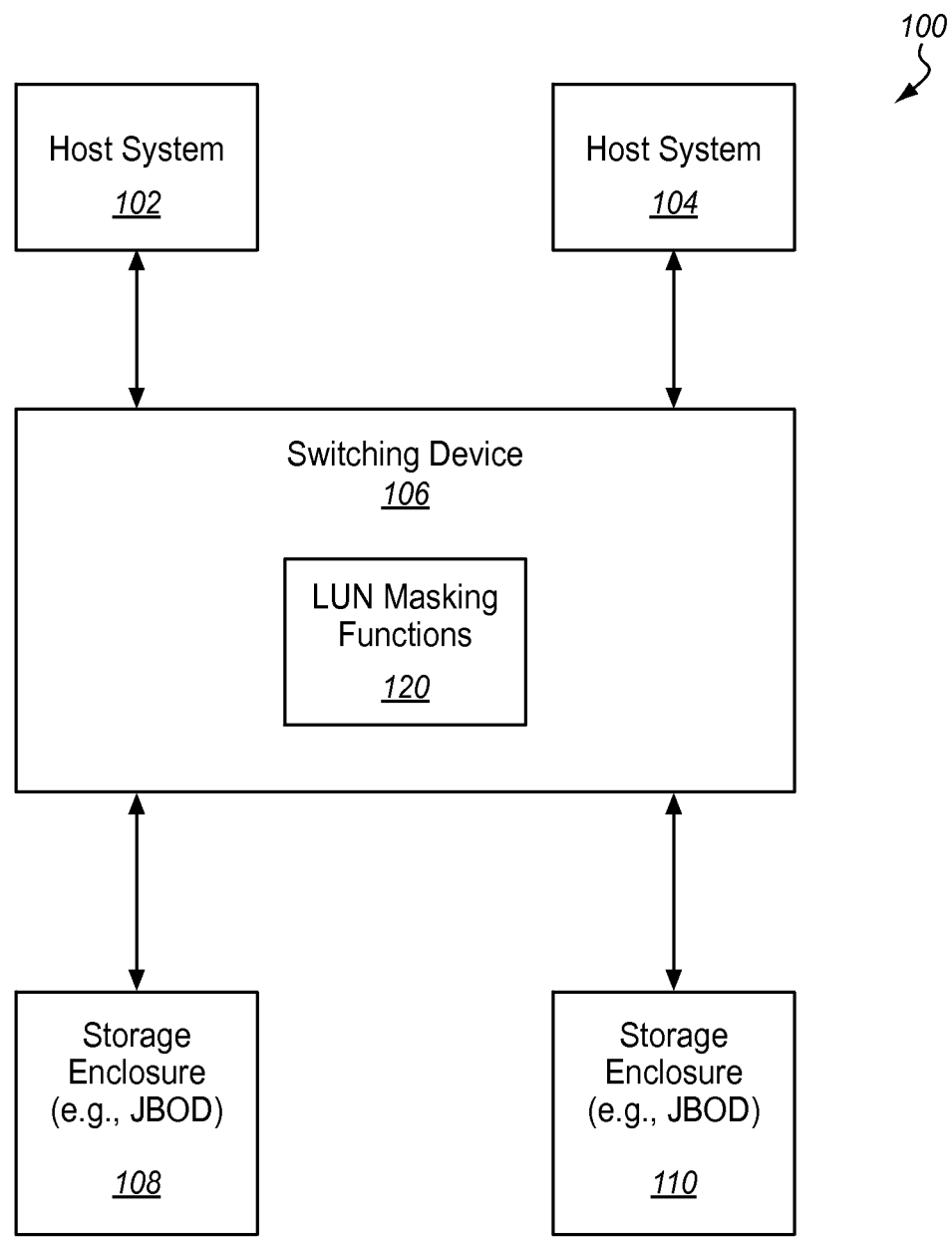
FIG. 1 is a block diagram an exemplary system enhanced in accordance with features and aspects hereof to include a switching device that provide LUN masking for attached storage enclosures.

FIG. 1 is a block diagram of an exemplary system 100 enhanced in accordance with features and aspects in that system 100 comprises enhanced switching device 106 that further comprises enhanced LUN masking functions 120. Switching device 106 is adapted to couple with one or more host systems 102 and 104 and adapted to couple with one or more storage enclosures 108 and 110. Host systems 102 and 104 may each comprise any suitable device or component (e.g., computer, server, workstation, etc.) adapted to generate requests for access to LUNs defined on one or more storage enclosures 108 and 110. Storage enclosures 108 and 110 represent any component comprising one or more storage devices often configured within an enclosure providing common power, cooling, and interfaces to the one or more storage devices within the enclosure. Such an enclosure is sometimes referred to as JBOD (just a bunch of drives) or, when the enclosure includes a local RAID storage controller, is sometimes referred to as an RBOD (RAID bunch of drives).

In some exemplary embodiments, switching device 106 may be a Serial Attached SCSI (SAS) expander adapted to couple with one or more SAS initiators (e.g., host systems 102 and 104) and adapted to couple with one or more SAS target devices (e.g., storage enclosures 108 and 110). In other exemplary embodiments, switching device 106 may provide Fibre Channel (FC) switching functions adapted to couple with one or more FC initiator devices and one or more FC target devices utilizing Fibre Channel communication media and protocols. Those of ordinary skill in the art will recognize numerous other so-called "switched fabric" configurations where LUN masking features 120 may be beneficially employed within switching device 106.

Still further, those of ordinary skill in the art will readily recognize that switching device 106 may couple with any number of host systems and with any number of storage enclosures and other storage components. Still further, switching device 106 may couple with any number of additional switching devices thus forming a switched fabric for coupling one or more host systems 102 and 104 to any of one or more storage enclosures 108 and 110.

Figure 2:
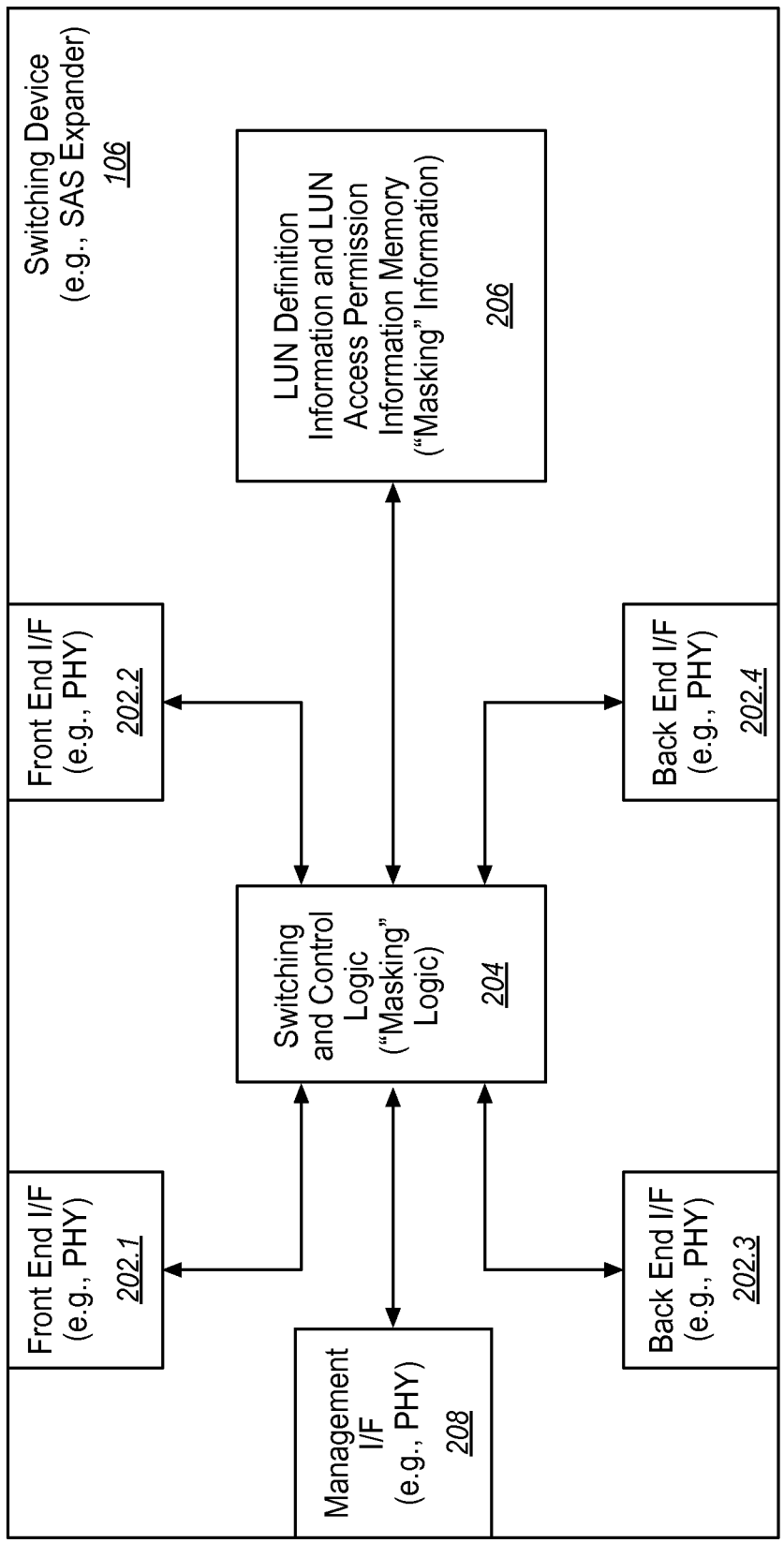
FIG. 2 is a flowchart describing exemplary additional details of an embodiment of the enhanced switching device of FIG. 1.

FIG. 2 is a block diagram providing additional details of an exemplary embodiment of switching device 106. As shown in FIG. 2, switching device 106 may be, for example, a SAS expander having a plurality of PHYs for coupling with other SAS components of the storage system. For example, switching device 106 may include one or more front end interface components 202.1 and 202.2 and one or more backend interface components 202.3 and 202.4. Each such front end or back end interface may comprise, for example, a PHY of a SAS expander. All such PHYs (front-end and backend interfaces) are coupled with switching and control logic 204 of switching device 106. Switching and control logic 204 provides for selective coupling to establish a temporary connection between a particular front end interface and an identified back end interface to allow for exchange of information between an initiator device and a target device through switching device 106. Those of ordinary skill in the art will readily recognize that switching and control logic 204 may be implemented as separate logic circuit components or may be tightly coupled as a single custom circuit within switching device 106. In general, switching and control logic 204 may be implemented as custom designed integrated circuits, as suitably programmed instructions executed by a general or special purpose processor within switching device 106, or any combination of such custom logic circuits and suitably programmed instructions.

Switching device 106 may also comprise a management interface 208 coupled with switching and control logic 204 adapted to allow an administrative node/user to interact with switching and control logic 204 for purposes of defining access permissions for LUNs known to switching device 106. In general, such LUN access permission information defines a level of access permitted (or denied) for each host system to access each LUN defined by each storage enclosure coupled with switching device 106. Such information may be constructed manually by an administrative user and provided to switching control logic 204 through management interface 208 utilizing any suitable graphical user interface and/or command LUN user interface. Further, such managerial information may be provided to switching device 106 utilizing SCSI management protocols (SMP) of a SAS domain or using other management protocols of any suitable switched fabric communication media and protocol. Further, in some embodiments, the LUN access permission information may be provided using any suitable out of band communication techniques. Such design choices are readily known to those of ordinary skill in the art.

The LUN access permission information so provided by an administrative node/user and/or LUN definition information may be stored in memory 206. In general, memory 206 may comprise any suitable memory component (e.g., random access memory—RAM) coupled with switching and control logic 204. Memory 206 is adapted to store LUN definition information identifying each LUN associated with a logical volume defined by each of the one or more storage enclosures. Further, memory 206 is adapted to store LUN access permission information indicating, for each defined LUN, a level of access permitted or denied to each of the host systems that may be attached to switching device 106.

Memory 206 may store one or more tables defining the LUN access permission information. Those of ordinary skill in the art will recognize numerous table and other data structures that may be employed to store such data. The following exemplary table identifies each LUN defined by each SAS target device (identified by its SAS address SASaddr-1 through SASaddr-x). The value stored in each field of the following exemplary table indicates whether the corresponding LUN (in columns LUN-0 through LUN-n) is defined ("1") or not defined ("0") within the corresponding SAS target device (i.e., the row where each target device is identified by its SAS address).

| Target SAS | LUN Information | | | | |
|---|---|---|---|---|---|
| Address | LUN-0 | LUN-1 | LUN-2 | ... | LUN-n |
| SASaddr-1 | 0 | 0 | 1 | ... | 1 |
| SASaddr-2 | 1 | 0 | 0 | ... | 0 |
| SASaddr-3 | 0 | 0 | 0 | ... | 1 |
| ... | ... | ... | ... | ... | ... |
| SASaddr-x | 1 | 1 | 0 | ... | 0 |

The following exemplary table comprises information indicative of which LUNs (identified by its LUN column) on each SAS target device (identified by its SAS target address column) are accessible to each SAS initiator device (identified by its SAS address row). The value stored in each field of the following exemplary table indicates whether the corresponding LUN (LUN-0 through LUN-N) of a corresponding SAS target address (column) is accessible ("A") or masked off ("M") to a corresponding SAS initiator device (row). In general LUNs that are not defined (as above) will be masked off (inaccessible) while LUNs that are defined within a SAS target device may be accessible or inaccessible (masked off) as desired.

| Initiator SAS Address | LUN Information | | | | | | | | | |
|---|---|---|---|---|---|---|---|---|---|---|
| | Target SASaddr-1 | | | | ... | Target SASaddr-x | | | | |
| | LUN-0 | LUN-1 | LUN-2 | ... | LUN-n | ... | LUN-0 | LUN-1 | LUN-2 | ... | LUN-n |
| SASaddr-1 | M | M | A | ... | A | ... | A | A | M | ... | M |
| SASaddr-2 | M | M | A | ... | A | ... | A | A | M | ... | M |
| SASaddr-3 | M | M | M | ... | A | ... | M | A | M | ... | M |
| ... | ... | ... | ... | ... | ... | ... | A | M | M | ... | M |
| SASaddr-y | M | M | A | ... | M | ... | A | A | M | ... | M |

In operation, having the LUN access permission information provided by a suitable administrative component, switching and control logic 204 provides "LUN masking" features to enhance operation of switching device 106. As noted above, by implementing LUN masking features within switching device 106, storage enclosures from any heterogeneous mix of vendors may be coupled with switching device 106 (directly or indirectly through other switching devices) regardless of whether they individually provide such LUN masking features and regardless of the format of any administrative interface provided by such storage enclosures that include LUN masking features. Rather, in accordance with features and aspects hereof, switching device 106 provides a common, unified interface to allow definition of LUN masking features for all storage enclosures coupled with switching device 106 regardless of vendor specific LUN masking features or the complete lack of LUN masking features in the storage enclosures.

In operation, control logic 204 is operable, responsive to receipt of a request from an attached host system, to determine from LUN access permission information stored in an appropriate structure of memory 206 whether the requesting host system is permitted the desired access to the identified LUN of an identified storage enclosure (both identified in the received request). If the requested access is permitted, logic 204 is further adapted to forward the request to the identified LUN of the identified storage enclosure for processing. Thus, only if the requested access is permitted will be received request be forwarded (unchanged) through the switching device to the identified storage enclosure. On the other hand, if the requested access is not permitted, the enhanced features of switching device 106 modify the request by altering the identified LUN in the received request to instead request access to a LUN that is not defined by the identified storage enclosure—i.e., to an "invalid" or "undefined" LUN. For example, the LUN in the received request may be modified to a predefined, reserved value that is known to be undefined in the identified storage enclosure. In one exemplary embodiment, the LUN in the received request may be modified to any value greater than the highest LUN value presently defined by the identified storage enclosure. In another exemplary embodiment, the LUN in the received request is modified to a predefined invalid LUN value (e.g., −1, etc.). The request so modified may then be forwarded to the identified storage enclosure to continue normal processing. In accordance with normal SCSI processing by the storage enclosure in receipt of an invalid LUN, the storage enclosure will complete the interaction with the requesting attached host system by returning an appropriate error code indicating an invalid or unknown LUN was identified in the received request.

In another aspect of its operation, control logic 204 of switching device 106 is further adapted to detect that a received request is a "REPORT LUNS" SCSI command. Such a SCSI command is typically generated by each attached host system as an aspect of initializing operations with attached storage enclosures coupled through switching device 106. For example, each host system may issue a REPORT LUNS SCSI command to each storage enclosure known to an attached host system through switching device 106. In accordance with the enhanced LUN masking features and aspects hereof, control logic 204 a switching device 106 intercepts such a REPORT LUNS SCSI command and responds directly to the requesting host by reporting only those LUNs to which the requesting host system is permitted access. Control logic 204 queries information stored in memory 206 to determine the LUN access permission granted or denied to the requesting host to thereby construct a response to the intercepted REPORT LUNS SCSI command.

Further details of exemplary operation of switching device 106 in the context of system 100 of FIGS. 1 and 2 are provided herein below with respect to other figures. Further, those of ordinary skill in the art will readily recognize numerous additional and equivalent elements that may be present in a fully functional switching device 106 and/or system 100. Such additional and equivalent elements are omitted herein for simplicity and brevity of this discussion.

Figure 3:
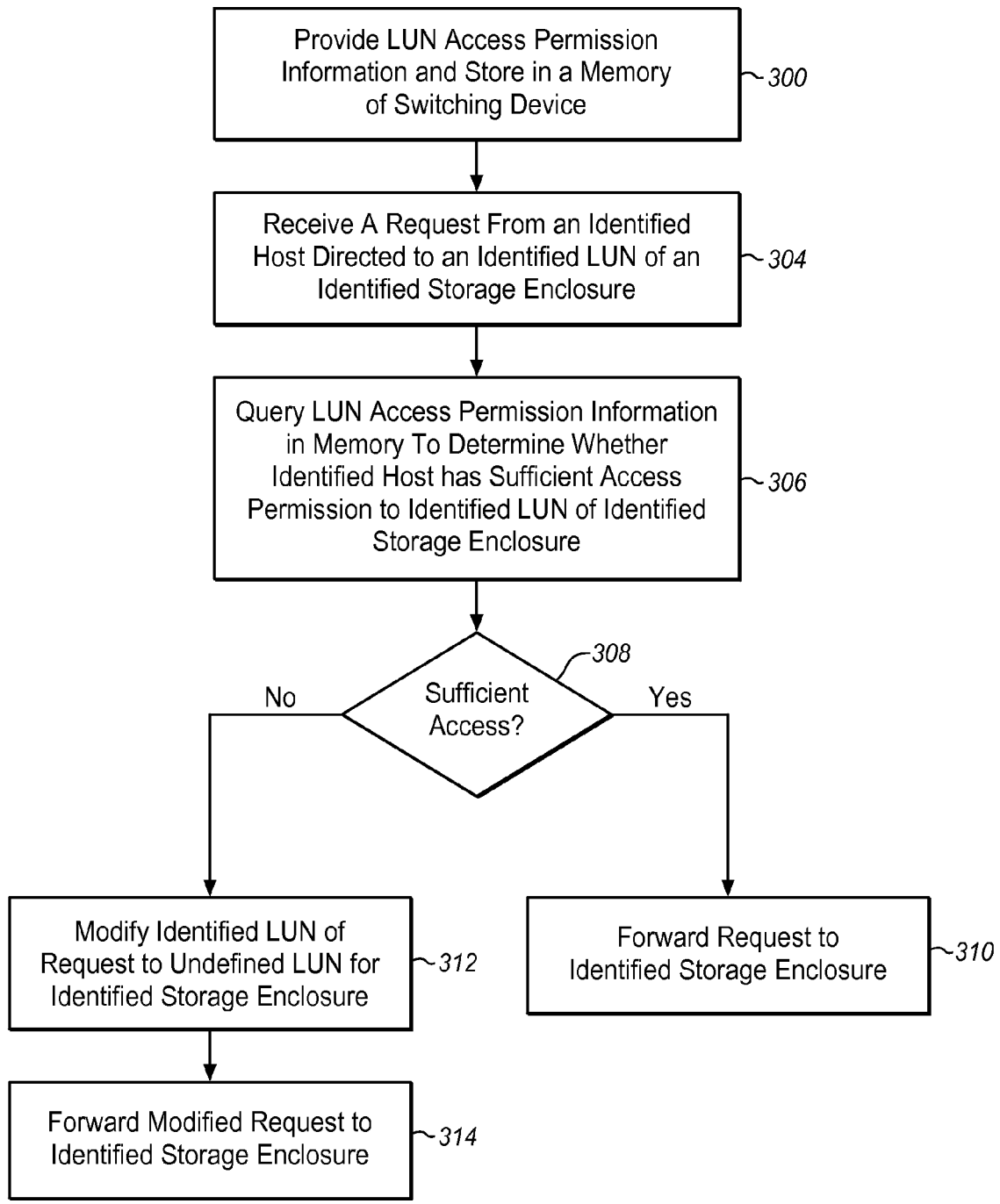
FIGS. 3 through 6 are flowcharts describing exemplary methods for LUN masking within a switching device of a system in accordance with features and aspects hereof.

FIG. 3 is a flowchart describing an exemplary method for implementing LUN masking features within a switching device. The method of FIG. 3 may be operable, for example, in switching device 106 of FIGS. 1 and 2 and more specifically may be operable in the enhanced switching and control logic 204 of switching device 106. At step 300, LUN access permission information is provided and stored in a memory of the switching device. As noted above such LUN access permission information identifies a level of access to be granted or denied for each host system for requested access to each LUN of each storage enclosure (that is each host and enclosure that may be coupled with the switching device). Such LUN access permission information may be provided by an administrative node/user coupled with the enhanced switching device. For example, an administrative user may provide such access permission information by manual entry through an appropriate graphical user interface or other command line user interface. At step 304, a request is received from an identified host system directed to an identified LUN of an identified storage enclosure. The request may comprise, for example, an Open Address Frame (OAF) in the context of a SAS storage system architecture. Responsive to receipt of such a request, step 306 queries the LUN access permission information stored in the memory of the switching device to determine whether the identified host has sufficient access permission to access the identified LUN of the identified storage enclosure in the received request. Step 308 then determines whether the query indicated sufficient or insufficient access to the identified LUN. If the requesting host system has sufficient access permission to the identified LUN, step 310 forwards the received request (unchanged) to the identified storage enclosure for further processing (i.e., standard SCSI processing). If step 308 determines that the query of step 306 indicates that insufficient access permission is granted to the identified host for access to the identified LUN, step 312 modifies the LUN identified in the received request into an undefined LUN for the identified storage enclosure. As noted above, the undefined LUN value may be any LUN value that is known to be invalid to the identified storage enclosure. For example, the undefined LUN may simply be any LUN value greater than the highest LUN value presently defined by the identified storage enclosure. Or, for example, in other exemplary embodiments, the undefined LUN may be a predefined, reserved, invalid LUN value such as "−1". Having so modified the received request, the modified request is then forwarded to the identified storage enclosure by operation of step 314. Having modified the identified LUN into a known invalid, undefined LUN value, the identified storage enclosure in accordance with standard SCSI processing, will return an appropriate error code indicating that an invalid LUN was provided in the received request. Thus, the switching device implementing the method of FIG. 3 provides LUN masking features regardless of the presence or absence of LUN masking features within each storage enclosure attached to the switching device. Further, in accordance with the method of FIG. 3, the enhanced switching device implements LUN masking regardless of the administrative interface defined by those storage enclosures that do provide proprietary LUN masking features.

Figure 4:
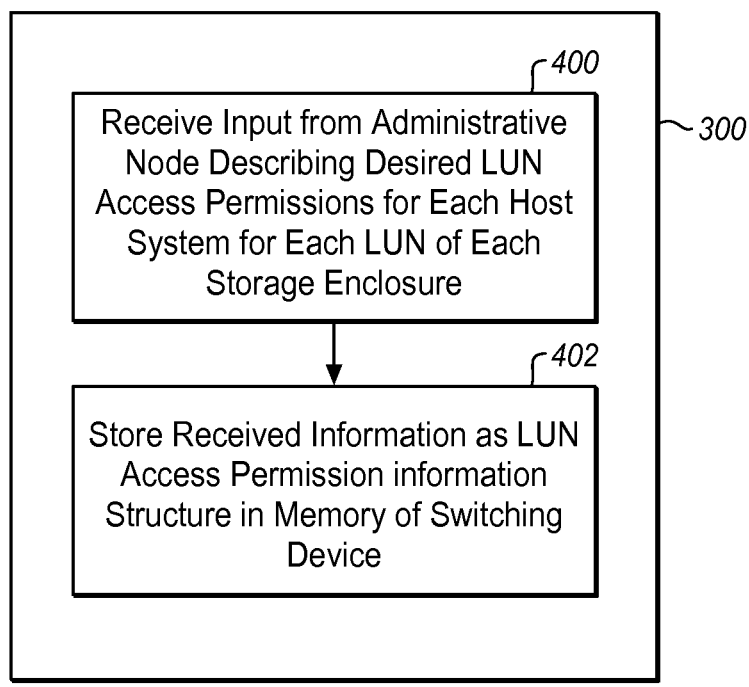

FIG. 4 is if flowchart providing exemplary additional details of step 300 of FIG. 3 to provide the LUN access permission information to be stored in a memory of enhanced switching device. At step 400, input is received from an administrative node/user describing the desired LUN access permissions for each host system for each LUN of each storage enclosure. The received information may be provided in any suitable syntax or format and is converted and stored in a memory of the enhanced switching device by operation of step 402. The LUN access permission information so provided may be provided from any device coupled with the enhanced switching device such as an administrative node under control of an administrative user. As noted above, such information may be provided utilizing any desired messages in accordance with any management protocol such as SMP or may be provided as out of band communications over any suitable interface of the enhanced switching device.

Figure 5:
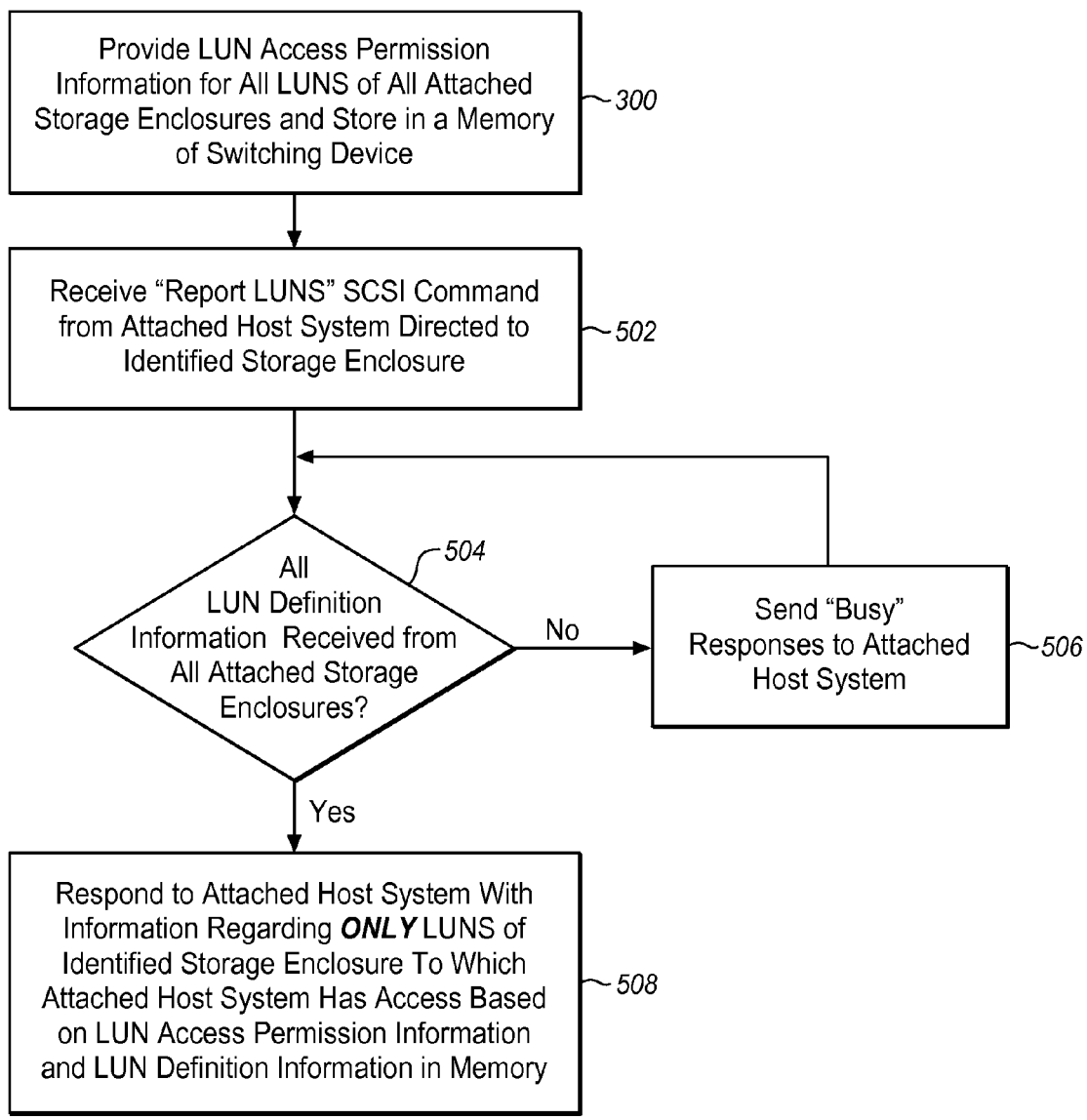

FIG. 5 is a flowchart describing another exemplary method in accordance with features and aspects hereof to provide LUN masking features within an enhanced switching device of a system. The method of FIG. 5 may be operable in an enhanced switching device such as switching device 106 of FIGS. 1 and 2 and more specifically may be operable in control logic 204 of such an enhanced switching device. Step 300 provides desired LUN access permission information as described above with respect to FIG. 3. At step 502, the enhanced switching device detects receipt of a "REPORT LUNS" SCSI command directed from an attached host system to an identified storage enclosure coupled with the enhanced storage switching device. Responsive to detecting receipt of such a REPORT LUNS SCSI command, the received command is not forwarded to the identified storage enclosure. Rather, steps 504 and 506 are iteratively operable to await receipt of LUN definition information within the enhanced switching device from each of the storage enclosures coupled with the enhanced switching device. More specifically, step 504 determines whether all LUN definition information has been received from all attached storage enclosures. If not, step 506 sends an appropriate "BUSY" or "NOT READY" response (in accordance with the implemented protocols) to the attached host system to force the requesting host system to wait for its expected response to the received REPORT LUNS SCSI command. When step 504 detects that all LUN definition information has successfully been received from all attached storage enclosures, step 508 next constructs and transmits an appropriate response to the attached host system comprising only information regarding LUNs of the identified storage enclosure to which the attached host system has access based on the LUN access permission information stored in a memory of the switching device and based on the LUN definition information received from all attached storage enclosures and also stored in memory of the switching device. Thus, step 508 returns an appropriate response to the received REPORT LUNS SCSI command but reports only those LUNs to which the requesting host system has some level of access permission provided. Other LUNs to which the requesting attached host system has no access are "masked" and thus not reported in the response to the received REPORT LUNS SCSI command.

Figure 6:
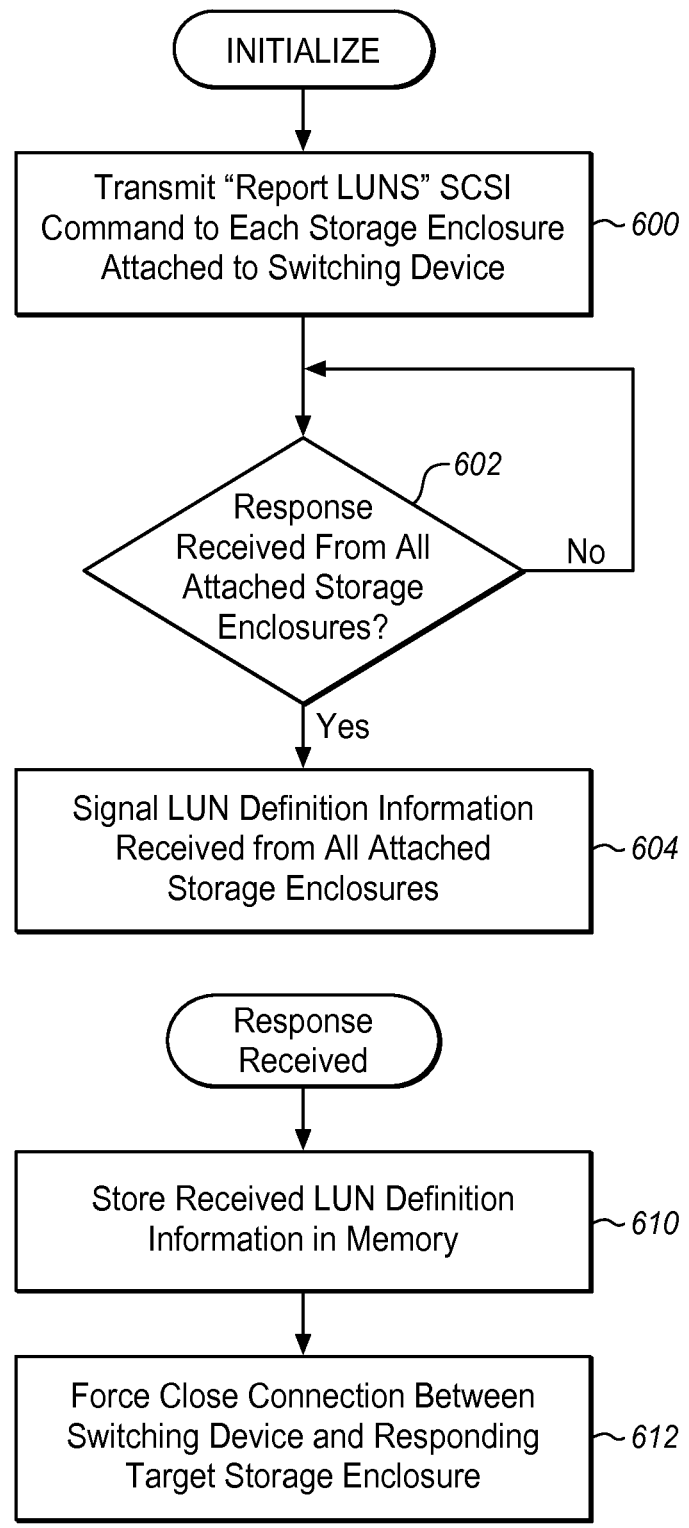

In order to obtain all of the LUN definition information expected by the test of step 504, the enhanced switching device generates its own REPORT LUNS SCSI commands (acting in the role of an initiator device) directed to each of the attached storage enclosures coupled with the enhanced switching device. FIG. 6 is a flowchart describing an exemplary method in accordance with features and aspects hereof to obtain LUN definition information within an enhanced switching device from each of the storage enclosures coupled with the enhanced switching device. The method of FIG. 6 may be performed within an enhanced switching device such as switching device 106 of FIGS. 1 and 2 and, more specifically, may be operable in enhanced control logic 204 of switching device 106. Step 600 is operable in response to initialization of the switching device or in response to any change of configuration of the system of which the switching device is a part. At step 600, a REPORT LUNS SCSI command is transmitted from the switching device to each storage enclosure presently coupled with the enhanced switching device. Step 602 is then iteratively operable to await receipt of a response from each such attached storage enclosure. Upon receipt of responses to the REPORT LUNS from each of the attached storage enclosures, step 604 signals completion of reception of the LUN definition information from each attached storage enclosure (thus allowing step 504 of FIG. 5 to continue processing at step 508).

Responsive to receipt of a response to the REPORT LUNS SCSI command sent to one of these storage enclosures, steps 610 and 612 are operable to store the received LUN definition information (in a suitable format in the memory of the switching device thus recording information regarding each LUN defined by the responding storage enclosure). Further, responsive to receipt of the expected response to the REPORT LUNS SCSI command, the enhanced control logic of the switching device forces closure of the connection between the switching device and responding target storage enclosure to the complete the interaction to obtain LUN definition information from the identified storage enclosure. In one exemplary embodiment, the connection between the switching device and the identified storage enclosure may be forced to close by transmission of a BREAK primitive on the link between the storage enclosure and the enhanced switching device. [Inventors, why can't the enhanced switching device (expander) simply do a normal "CLOSE" and "DONE" to normally complete the handshake between the expander and the target storage enclosure?]

Those of ordinary skill in the art will readily recognize numerous additional and equivalent steps that may be present in a fully functional method such as the methods of FIGS. 3 through 6. Such additional and equivalent steps are omitted herein for simplicity and brevity of this discussion.

While the invention has been illustrated and described in the drawings and foregoing description, such illustration and description is to be considered as exemplary and not restrictive in character. One embodiment of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalent.

What is claimed is:

1. A switching device operable to selectively couple one or more host systems with one or more storage enclosures, each storage enclosure defining one or more logical devices, each logical device associated with a corresponding logical unit number (LUN), the switching device comprising:
    a back end interface adapted to communicatively couple the switching device with the one or more storage enclosures;
    a front end interface adapted to communicatively couple the switching device with the one or more host systems;
    switching logic coupled with the front end interface and coupled with the back end interface, the switching logic adapted to controllably establish a logical connection between a host system through the front end interface and a logical volume of the storage enclosure through the back end interface, wherein the logical volume is identified by a corresponding LUN;
    control logic coupled with the switching logic and coupled with the front end interface, the control logic adapted, for each of multiple requests received through the front end interface, to identify a host system that generated the request, and to determine whether the identified host system is permitted to access a LUN identified in the request, the control logic further adapted to control the switching logic to forward the request for processing to the identified LUN only in response to determining that the identified host system is permitted to access the identified LUN,
    the control logic is further adapted, responsive to determining that the identified host system does not have sufficient access permission to the identified LUN, to: modify the identified LUN in the request to a predetermined undefined LUN for the identified storage enclosure, forward the request as modified with the predetermined undefined LUN to the identified storage enclosure for processing, and receive an error from the storage enclosure in response to the request as modified.

2. The switching device of claim 1 further comprising:
    a memory coupled with the control logic, the memory adapted to store LUN definition information for each LUN defined by each of the one or more storage enclosures,
    wherein the control logic is further adapted to query each of the one or more storage enclosures for the LUN definition information and to store the received LUN definition information in the memory.

3. The switching device of claim 2
    wherein the control logic is further adapted to receive LUN access permission information from an administrative node and is further adapted to store the LUN access permission information in the memory,
    wherein the control logic determines whether the host system is permitted to access the LUN by querying the LUN access permission information in the memory.

4. The switching device of claim 3
    wherein the LUN definition information comprises a structure in the memory identifying LUNs associated with a target address of each of the one or more storage enclosures.

5. The switching device of claim 3
    wherein the LUN access permission information comprises a structure in the memory identifying a level of access permission for each of the one or more host systems to access each of the LUNs associated with the target addresses of each of the one or more storage enclosures.

6. The switching device of claim 1
    wherein the switching device is a Serial Attached Small Computer System Interface (SAS) expander,
    wherein each of the one or more host systems is associated with a corresponding SAS initiator address, and
    wherein each of the one or more storage enclosures is associated with a corresponding SAS target address.

7. The switching device of claim 6 further comprising:
    a memory coupled with the control logic,
    the memory adapted to store a LUN definition information table associating each LUN with the SAS target address of the storage enclosure that defined the LUN,
    the memory further adapted to store a LUN access permission table associating a level of access permission for each SAS initiator address to access each of the LUNs associated with each SAS target addresses.

8. The switching device of claim 7 wherein each level of access permission comprises one or more of: no access, read-only access, and read-write access.

9. A method operable in a switching device, the switching device adapted to couple with one or more host systems and adapted to couple with one or more storage enclosures, wherein each storage enclosure defines one or more logical volumes each volume identified by a corresponding logical unit number (LUN), the method comprising:
providing a LUN access permission structure in a memory of the switching device wherein the LUN access permission structure identifies a level of access permission for each host system to access each LUN of each storage enclosure;
receiving multiple Small Computer System Interface (SCSI) requests that are each directed to an identified LUN of an identified storage enclosure; and
for each of the multiple requests:
identifying an attached host system that generated the request;
querying the LUN access permission structure to determine whether the identified attached host system has sufficient access permission to the LUN identified in the received request;
forwarding the request for processing at the identified storage enclosure only in response to determining that the identified attached host system has sufficient access permission to the identified LUN; and
responsive to determining that the identified attached host system does not have sufficient access permission to the identified LUN, performing the additional steps of:
modifying the identified LUN in the request to a predetermined undefined LUN for the identified storage enclosure;
forwarding the request as modified with the predetermined undefined LUN to the identified storage enclosure for processing; and
receiving an error from the storage enclosure in response to the request as modified.

10. The method of claim 9 wherein:
the error comprises an error code indicating an invalid LUN.

11. The method of claim 10 wherein the predetermined undefined LUN is a value greater than a largest LUN defined by the storage enclosure.

12. The method of claim 10 wherein the predetermined undefined LUN is a reserved value associated with no defined LUN of the storage enclosure.

13. The method of claim 9 further comprising:
receiving information to generate the LUN access permission structure from an administrative node coupled with the switching device;
generating the LUN access permission structure based on the received information; and
storing the generated LUN access permission structure in a memory of the switching device.

14. A method operable in a Serial Attached Small Computer System Interface (SAS) expander to implement Logical Unit Number (LUN) masking, the expander adapted to couple with one or more host systems and adapted to couple with one or more storage enclosures, each storage enclosure defining one or more logical volumes each associated with a corresponding LUN, the method comprising:
storing a LUN access permission structure in a memory of the expander wherein the LUN access permission structure identifies a level of access permission for each host system to access each LUN of each storage enclosure;
storing LUN definition information for each of the LUNs;
receiving multiple "REPORT LUNS" SCSI commands in the expander that are each directed to an identified storage enclosure after the LUN access permission structure and LUN definition information have been stored; and
for each of the multiple "REPORT LUNS" commands:
identifying an attached host system that generated the "REPORT LUNS" command;
determining, responsive to receipt of the "REPORT LUNS" command and based on information in the LUN access permission structure, which LUNS of the identified storage enclosure the identified attached host system has permission to access;
responding to the "REPORT LUNS" command by constructing a report indicating only LUNS to which the identified attached host system has access as determined based on the LUN definition information and the LUN access permission structure, and transmitting the report from the expander to the attached host system.

15. The method of claim 14 wherein the step of determining further comprises:
determining whether the expander has received LUN definition information from each of the one or more storage enclosures wherein the LUN definition information from each storage enclosure identifies all LUNS defined by said each storage enclosure; and
responsive to determining that the expander has not yet received LUN definition information from each storage enclosure, awaiting receipt of LUN definition information from each of the one or more storage enclosures.

16. The method of claim 15 wherein the step of determining whether the expander has received LUN definition information from each of the one or more storage enclosures further comprises:
determining whether the expander has requested LUN definition information from each of the one or more storage enclosures; and
responsive to determining that the expander has not requested LUN definition information from one or more of the storage enclosures, transmitting a "REPORT LUNS" command to one or more storage enclosures to request LUN definition information.

17. The method of claim 16 wherein the step of responding further comprises:
responding to the "REPORT LUNS" command by reporting from the expander to the attached host system only LUNS defined by the LUN definition information received from the one or more storage enclosures and to which the attached host system has access as determined based on information in the LUN access permission structure.

18. The switching device of claim 1 wherein the control logic is further adapted to detect that the request received from the host system comprises a REPORT LUNS Small Computer System Interface (SCSI) command.

19. The method of claim 9 wherein one of the multiple requests comprises a REPORT LUNS Small Computer System Interface (SCSI) command.

20. The method of claim 14 wherein the LUN access permission structure comprises a table that correlates SAS addresses with LUN permissions.

* * * * *